Dec. 23, 1952     H. G. WASSERLEIN     2,622,893
WHEELED ATTACHMENT FOR TRANSPORTING BOATS
Filed April 16, 1949     3 Sheets-Sheet 3
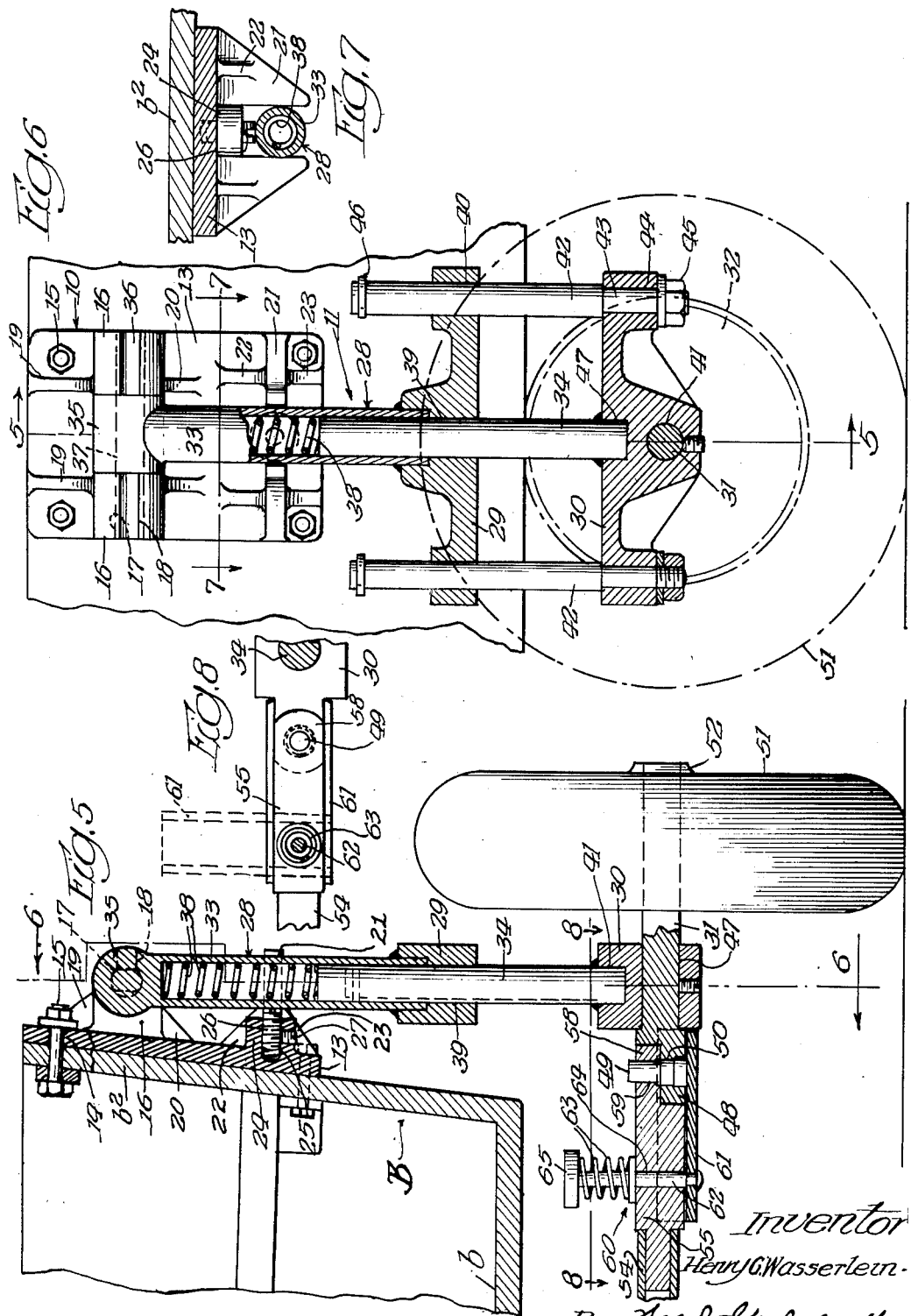
Inventor
Henry G. Wasserlein
By Fred Gerlach Atty.

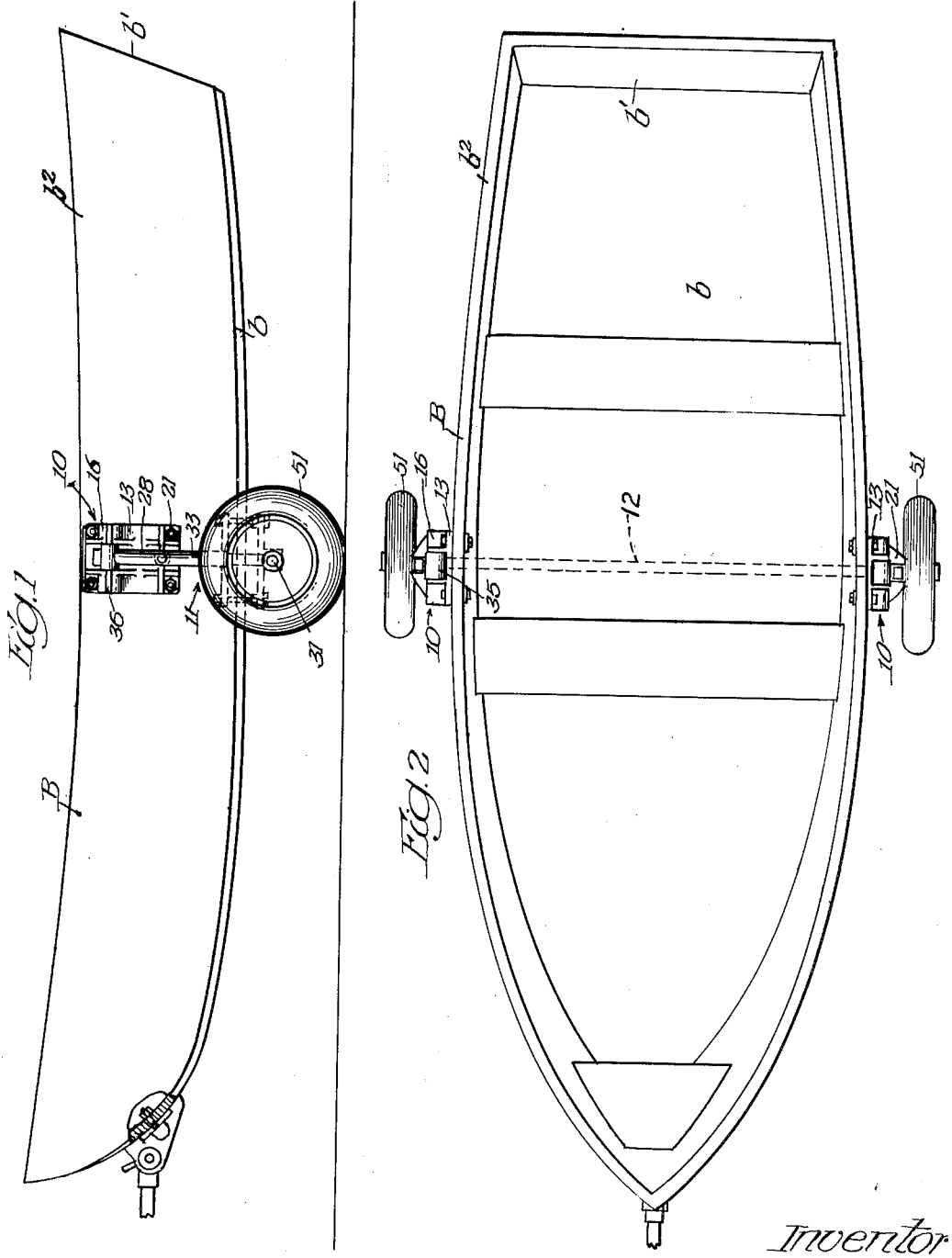

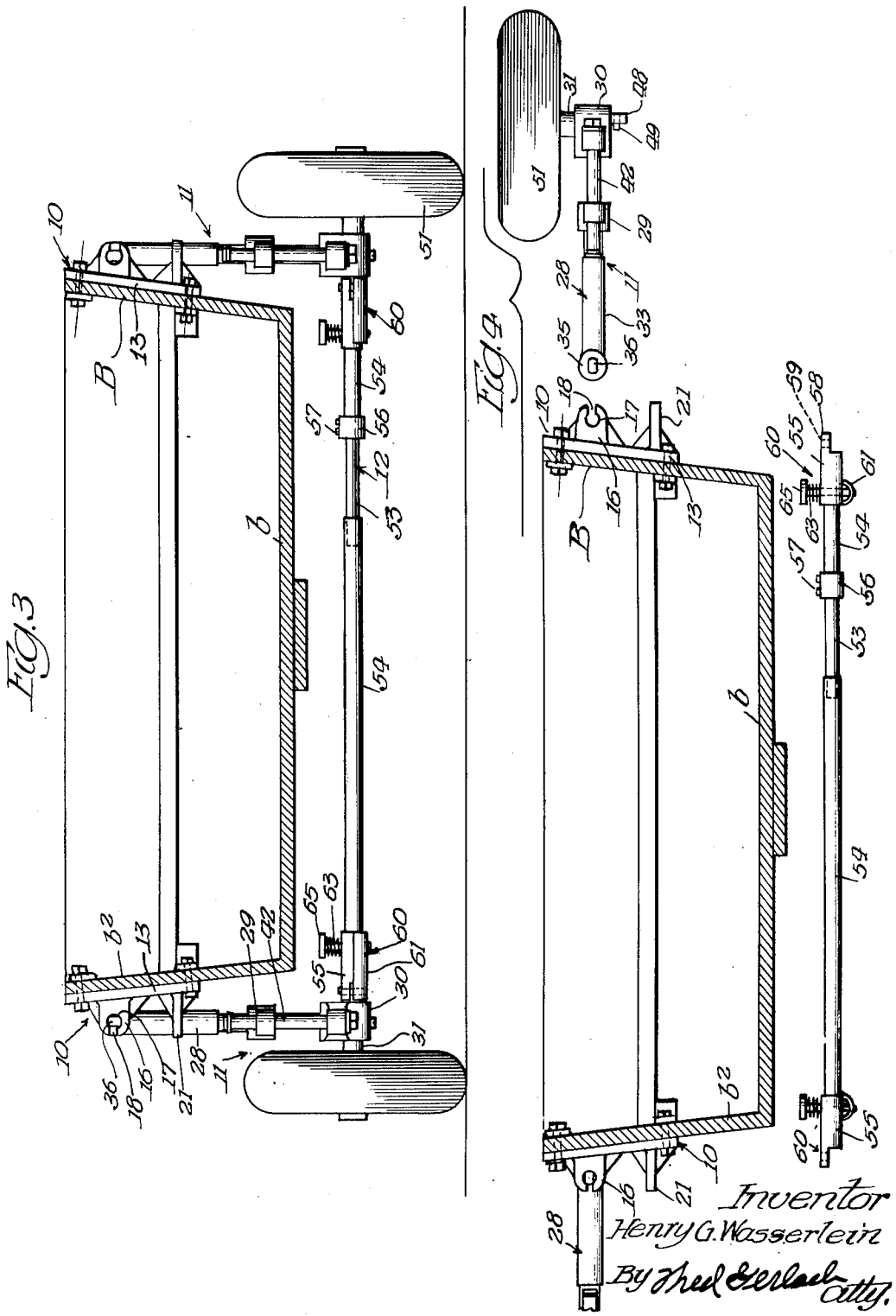

Patented Dec. 23, 1952

2,622,893

UNITED STATES PATENT OFFICE 2,622,893

WHEELED ATTACHMENT FOR TRANSPORTING BOATS

Henry G. Wasserlein, Joliet, Ill.

Application April 16, 1949, Serial No. 87,974

2 Claims. (Cl. 280—61)

The present invention relates generally to boat trailers. More particularly the invention relates to that type of boat trailer which is adapted to support a boat so that it may be towed from place to place by an automobile or other vehicle and comprises: (1) a pair of brackets having means for fixed attachment to the upper central portions of the sides of the boat; (2) a pair of wheel assemblies which are associated respectively with, and are connected detachably to, the brackets and when in their operative or normal position extend downwards so that the wheels thereof rest on the ground; and (3) a tie rod which is designed to extend under and transversely of the boat, has detachable means at its ends for connection with the wheel assemblies and serves when connected to the assemblies to hold the latter in their operative position.

One object of the invention is to provide a boat trailer of this type which is an improvement upon, and has certain inherent advantages over, previously designed boat trailers and is characterized by the fact that it is essentially simple in design and may be quickly and readily assembled for use and dismantled after use.

Another object of the invention is to provide a boat trailer of the aforementioned type in which the wheel assemblies embody spring loaded telescopic struts, the lower ends of which have transversely extending axles for the wheels and the upper ends of which have between them and the brackets detachable connections of such character that the wheel assemblies are connectable to, and disconnectable from, the brackets when swung upwards and outwards into a substantially horizontal position and when swung downwards and inwards are in interlocked relation with the brackets.

Another object of the invention is to provide a boat trailer of the last mentioned character in which the brackets have at the lower portions thereof outwardly extending fork shaped members which when the wheel assemblies are swung downwards and inwards into their operative position straddle the upper ends of the spring loaded telescopic struts and coact with the detachable connections between the upper ends of the struts and the brackets to hold the struts against fore and aft lateral displacement with respect to the boat.

Another object of the invention is to provide a boat trailer of the type and character under consideration in which the brackets are capable of being applied to any boat regardless of the degree of upward and outward inclination of its sides and have in associated relation with the outwardly extending fork shaped members transversely extending adjusting screws which when properly adjusted and in connection with use of the trailer serve to hold the spring loaded telescopic struts of the wheel assemblies in a truly vertical position.

A further object of the invention is to provide a boat trailer of the type and character heretofore mentioned in which the tie rod is of longitudinally adjustable or telescopic character and embodies at its ends quickly or readily manipulatable detachable connections for connection to the inner ends of the axles of the wheel assemblies.

A still further object of the invention is to provide a boat trailer which is generally of new and improved construction, effectively and efficiently fulfills its intended purpose and may be manufactured or fabricated at a comparatively low cost.

Other objects of the invention and the various advantages and characteristics of the present boat trailer will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a side elevation of a boat having applied thereto a trailer embodying the invention, the trailer being shown in its normal or operative position wherein it serves to support the boat so that it may be towed from place to place;

Figure 2 is a plan view of the boat and trailer;

Figure 3 is an enlarged vertical transverse section of the boat showing in detail the construction and arrangement of the various parts of the trailer;

Figure 4 is another enlarged vertical transverse section illustrating the manner in which the wheel assemblies are initially connected to the brackets after being swung upwards and outwards into a substantially horizontal position;

Figure 5 is an enlarged transverse section of one of the wheel assemblies and its associated bracket, illustrating in detail the construction and design of the wheel essembly struts and the detachable connections between the ends of the tie rod and the inner ends of the axles of the wheel assemblies;

Figure 6 is a vertical section on the line 6—6 of Figure 5;

Figure 7 is a horizontal section on the line 7—7 of Figure 6; and

Figure 8 is a horizontal section on the line 8—8 of Figure 5.

The trailer which is illustrated in the drawings constitutes the preferred form or embodiment of the invention. It serves as a medium or instrumentality for supporting a boat B so that it may be towed from place to place by an automobile or other vehicle and as its component parts comprises a pair of brackets 10, a pair of wheel assemblies 11 and a tie rod 12. The boat B may be a row boat, a motor boat or any other type of boat and is illustrated in the drawings as comprising a bottom b, a back b¹ and a pair of sides b². The sides are connected to, and extend upwards and outwards from, the side margins of the bottom and have the front ends thereof curved towards one another so as to define with the front portion of the bottom b the bow of the boat B. It is contemplated that when it is desired to transport the boat from one place to another the trailer will be utilized by assembling it as hereinafter described in detail. The bow of the boat is provided with any conventional unit whereby it may be pivotally connected to the rear end of the automobile which is used to tow the boat to its destination. Upon arrival of the boat at its destination the attaching unit is disconnected and the trailer is dismantled in order to place the boat in condition for use.

The brackets 10 are preferably in the form of metallic castings and are disposed exteriorly of the upper central portions of the sides b² of the boat B. They embody vertically elongated, substantially rectangular base plates 13 and these are provided at the corners thereof with transversely extending holes 14. Bolts 15 extend through the holes 14 and serve fixedly to secure the brackets 10 against the outer surfaces of the upper central portions of the boat sides b², as shown in Figure 5 of the drawings. The upper portions of the base plates 13 of the brackets are provided with pairs of spaced apart horizontally extending lugs 16. The latter are formed integrally with, and extend outwards from, the upper ends of the base plates 13 and have in the central portions thereof cylindrical, horizontally extending, open ended sockets 17. Horizontal full length slots 18 are formed in the outer portions of the lugs 16 and form entrances to the sockets 17. The height of the slots 18 is less than the diameter of the sockets in order that the entrances are of a restricted nature or character. As best shown in Figure 6 the outer ends of the lugs 16 terminate adjacent the side margins of the base plates 13. The lugs 16 are reenforced by way of upper webs 19 and lower webs 20. The upper webs extend vertically and outwards and are formed integrally with the upper portions of the base plates 13 and the inner ends of the lugs 16. The lower webs 20 extend vertically and outwards and are formed integrally with the central portions of the base plates 13 and the inner ends of the lugs 16. The lower portions of the base plates 13 of the brackets 10 are provided with integral outwardly extending fork shaped members 21. The latter are located a small distance beneath the inner ends of the lugs 16 and are reenforced by vertically extending upper webs 22 and vertically extending lower webs 23. Such webs are formed integrally with the lower portions of the base plates 13 and the outer portions of the members 21. The central inner portions of the outwardly extending fork shaped members 21 are enlarged and shaped to form substantially cylindrical bosses 24 with screw threaded holes 25 in their central portions. Horizontally extending adjusting screws 26 fit within the holes 25 and are secured in their various adjusted positions by way of set screws 27 which extend transversely through the lower portions of the bosses 24. When the set screws 27 are released or removed the adjusting screws 26 by turning in one direction or the other may be adjusted inwards or outwards with respect to the lower portions of the base plates 13 of the brackets. The purpose of the adjusting screws 26 will appear hereafter.

The wheel assemblies 11 are associated with the brackets 10, respectively, and each consists of a telescopic strut 28, an upper fitting 29, a lower fitting 30, an axle 31 and a wheel 32.

The struts are spring loaded as described more in detail hereafter and consist of tubular upper sections 33 and solid lower sections 34. The upper sections have open lower ends and are preferably circular or annular in cross section. They embody at their upper ends horizontally extending cylindrical enlargements 35 and these are welded or otherwise fixedly secured in place and are adapted, when the trailer is assembled, to fit snugly between the inner ends of the lugs 16 on the upper portions of the base plates 13 of the brackets. Horizontally extending bars 36 extend through open ended holes 37 in the central portions of the enlargements 35. The central portions of the bars are suitably fixedly secured within the holes 37 and the ends of the bars project outwards from the ends of the enlargements 35 a distance corresponding to the length of the lugs 16. The sides of the bars are flat and are spaced apart a distance slightly less than the height of the slots 18 in the outer portions of the lugs 16. The top and bottom surfaces of the bars are curved in conformity with the cylindrical sockets 17 and are spaced apart a distance corresponding to approximately the diameter of the sockets. The ends of the bars 36 are adapted to fit within the sockets 17 and form with the lugs 16 quickly detachable connections between the upper ends of the struts 28 and the lugs 16 on the upper portions of the base plates of the brackets 10. In order to connect the struts 28 of the wheel assemblies 12 to the brackets 10 the struts are swung upwards and outwards until they are positioned as shown in Figure 4. In such position the struts extend horizontally and the ends of the bars 36 are aligned with the slots 18 and have the flat sides thereof positioned horizontally. After proper positioning of the struts the latter are shifted inwards so as to cause the ends of the bars 36 to pass through the slots 18 into the sockets 17. After such shift or movement the struts are swung downwards into their operative position wherein they extend vertically. In connection with downward swinging of the struts the ends of the bars turn within the sockets so that their flat sides extend vertically and the upper and lower surfaces are in interlocked relation with the sockets. To remove the wheel assemblies from the brackets it is only necessary to swing the assemblies upwards and outwards and then shift them away from the brackets in order to withdraw the ends of the bars 36 from the sockets 17 via the slots 18. When the struts of the wheel assemblies are in their operative position the central portions of the tubular upper sections 33 of the struts fit within, and are straddled by, the outwardly extending fork shaped members 21 on the lower portions of the base plates of the brackets and such members coact with the detachable connections consisting of the bars 36 and the lugs 16 to lock or hold the struts against fore and aft lateral displacement with respect to the boat B. Downward and inward swinging of the struts into their operative position is limited by the outer ends of the adjusting screws 26. By properly adjusting such screws the struts may be controlled so that when they are in their operative position they extend in a truly vertical position. The solid lower sections 34 of the struts 28 correspond in shape, so far as cross section is concerned, to the inner peripheries of the upper sections 33 and have the upper ends thereof slidably mounted in the lower ends of the upper sections. Spiral compression springs 38 are located in the upper ends of the upper sections 33 of the struts and serve to urge apart the lower and upper strut sections. As best shown in Figure 5 the upper ends of the springs 38 abut against the central portions of the enlargements 35 and the lower ends of the springs abut against the upper end faces of the lower sections of the struts.

The upper fittings 29 of the wheel assemblies 11 are preferably in the form of metallic castings. They are horizontally elongated and when the trailer is in its assembled condition extend lengthwise of the sides $b^2$ of the boat B. The central portions of the upper fittings are suitably fixedly connected to the lower ends of the tubular upper sections 33 of the struts 28 and have vertically extending bores 39 through which the lower strut sections extend slidably. The ends of the upper fittings 29 are provided with vertically extending open ended bores 40.

The lower fittings 30 of the wheel assemblies 11, like the upper fittings 29, are preferably in the form of metallic castings. They are horizontally elongated and extend lengthwise of the sides of the boat when the wheel assemblies are in their operative position. As best shown in Figure 6 of the drawings the lower fittings 30 underlie and are in parallel relation with the upper fittings 29 and have in the upper central portions thereof cylindrical sockets 41 in which the lower ends of the solid lower sections 34 of the struts 28 are fixedly secured. By reason of the fact that the lower fittings are fixedly secured to the lower ends of the lower strut sections 34 and the upper fittings 29 are fixedly secured to the lower ends of the upper tubular sections 33 the lower fittings move relatively to the upper fittings in connection with relative sliding movement of the lower and upper sections of the struts. Vertically extending rods 42 serve to limit sliding movement of the lower and upper strut sections away from one another and also guide the lower strut sections for truly rectilinear sliding movement with respect to the upper sections. The lower ends of the rods 42 are provided with reduced screw threaded stems 43 and these extend through vertically extending open ended bores 44 in the ends of the lower fittings 30 and have on the lower ends thereof clamping nuts 45 whereby the rods are held or maintained in fixed relation with the lower fittings 30. The upper ends of the rods 42 extend slidably through the bores 40 in the ends of the fittings 29 and embody at their extremities snap rings 46. The latter fit within grooves in the upper extremities of the rods 42 and coact with the ends of the upper fittings 29 to limit sliding movement of the lower and upper fittings away from one another.

The axles 31 extend horizontally and are circular in cross section. The cenral portions of the axles extend through, and are suitably fixedly mounted within, horizontal open ended sockets 47 in the lower central portions of the lower fittings 30. When the wheel assemblies 11 are in their operative position wherein the struts 28 extend vertically, the sockets 47 are coaxial, and hence maintain the axles 31 in longitudinal alignment. The inner ends of the axles have the upper portions thereof cut away or removed so as to form fingers 48 which are semicylindrical and have flat upper faces. As shown in Figure 5 the fingers 48 are provided with vertically extending pins 49. The lower ends of these pins are fixedly secured in vertically extending sockets 50 in the central portions of the fingers and the upper ends of the pins project above the fingers.

The wheels 32 of the assemblies 11 are provided with pneumatic tires 51 and have hubs 52. The latter are suitably rotatably mounted on the outer ends of the axles 31. When the trailer is in its operative position the wheels 32 together with the other parts of the wheel assemblies 11 and the brackets 10 serve to hold the boat B in an elevated position with respect to the ground. By reason of the fact that the wheels have pneumatic tires and the wheel assemblies include the spiral compression springs 38 the trailer serves yieldingly or resiliently to support the boat over the ground.

The tie rod 12 operates when the wheel assemblies are in their operative position to hold the assemblies in such position. It is adapted to underlie and extend transversely of the central portion of the bottom $b$ of the boat B and comprises a rod 53, a pair of tubes 54 outwards of the rod, and a pair of fixtures 55 outwards of the tubes. All of these parts of the tie rod are arranged in coaxial or longitudinal alignment. One end of the rod 53 fits within, and is welded or otherwise fixedly secured to, the inner end of one of the tubes 54. The other end of the rod 53 fits slidably within the inner end of the other tube and is adjustably secured in place by means of a collar 56 which is welded to the inner end of said other tube and embodies a plurality of transversely extending set screws 57. By loosening the set screws the tie rod 12 may be lengthened or shortened to the proper length for use. After lengthening or shortening the tie rod the set screws are tightened so that the component parts of the rod are in fixed relation. By providing means whereby the tie rod may be adjusted as to length it is possible to apply the trailer to boats that vary in width. The fixtures 55 are for the most part circular in cross section and are welded to, and form continuations of, the outer ends of the tubes 54. They are preferably formed of solid metal and are the same in diameter as the inner ends of the axles 31 of the wheel assemblies 19. The lower portions of the outer ends of the fittings 55 are cut away to form fingers 58 which are semicylindrical and have flat lower faces. As shown in Figure 5 the fingers 58 are the complement of the fingers 48 on the inner ends of the axles and have vertically extending open ended sockets 59 for receiving the upper exposed ends of the pins 49. When the fingers 58 are applied to the upper ends of the pins 49 the tie rod 12 is in its operative position and serves to hold the wheel assemblies 11 against outward and upward swinging movement. The complemental fingers 48 and 58 together with the pins 49 form detachable connections between the ends of the tie rod 12 and the inner ends of the axles 31. In order to connect the tie rod to the inner ends of the axles after the wheel assemblies are in their operative position it is only necessary first to manipulate the tie rod so that the fingers 58 overlie the fingers 48 and then to lower the tie rod in order to bring the upper ends of the pins 49 into seated relation with the sockets 59 in the fingers 58. Latches 60 serve releasably to hold the ends of the tie rod 12 in connected relation with the inner ends of the axles 31. Such latches are two in number and each consists of a horizontally extending plate 61, an upstanding pin 62 and a spiral compression spring 63. The plates 61 of the latches 60 are semicircular in cross section and underlie the fittings 55 of the tie rod 12. They are mounted by way of the upstanding pins 62 to swing back and forth between an operative position wherein they extend lengthwise of the fittings 55 of the tie rod 12 and their outer ends underlie the fingers 48 on the inner ends of the axles 41 and an inoperative position wherein they extend at right angles to the fittings. The pins 62 are fixedly connected to the inner ends of the plates 61 and extend through, and are rotatably mounted in, vertically extending open ended bores 64 in the inner ends of the fittings 55. The upper ends of the pins extend beyond the fittings and are provided at their extremities with enlarged heads 65. The compression springs 63 surround the upper ends of the pins 62 and are interposed between the heads 65 and the inner ends of the fittings 55. They serve through the medium of the upstanding pins 62 to urge the plates 61 upwards to the end that when the plates are in their operative position they fit snugly around the bottom portions of the fittings 59 and the fingers 48 and are thus held in place. When it is desired to release the latches 60 the enlarged heads 65 on the upper extremities of the pins 62 are first depressed and are then turned 90°. In connection with depression or downward shift of the heads 65 the pins 62 slide downwards and operate to depress the plates 61 so that the latter are released from interlocked relation with the bottom portions of the fittings 55 and and the fingers 48. 90° turning of the heads 65 results in swinging of the plates 61 into their inoperative position wherein, as previously pointed out, they extend at right angles to the fittings. As soon as the latches are released by manipulation in the aforementioned manner the tie rod may be disconnected from the inner ends of the axles 31 by merely shifting it upwards in order to bring the upper ends of the pins 49 out of seated relation with the sockets 59 in the fingers 58.

When it is desired to apply and use the trailer the wheel assemblies 11 are connected to the brackets 60 by first manipulating them into a position wherein the struts 28 extend horizontally and then shifting them inwards in order to cause the ends of the bars 36 to pass through the slots 18 into the sockets 17. After the ends of the bars are disposed in the sockets the wheel assemblies are released so that they swing downwards by gravity until arrested as a result of the lower portions of the tires striking the ground. After release of the wheel assemblies the boat B is raised by hand, or otherwise, until the wheel assemblies swing downwards into their operative position wherein the struts 28 extend vertically. Thereafter the boat is lowered until the wheels 32 rest on the ground. After this operation the tie rod 12 is positioned beneath and crosswise of the central portion of the boat and its ends are connected to the inner ends of the axles 31 as hereinbefore described. As soon as the tie rod is in place, the latches 60 are shifted into their operative position by swinging the plates 61 into a position wherein they extend under the bottom portions of the fittings 55 and the fingers 48. As soon as the plates are so swung the compression springs 63 of the latches shift the plates upwards so that they are in interlocked relation with said bottom portions of the fittings 55 and the fingers 48. When it is desired to use the boat the trailer is dismantled by first releasing the latches 60 and then removing the wheel assemblies 11 from the brackets 10.

The herein described boat trailer, due to its particular design and construction, effectively and efficiently fulfills its intended purpose and may be assembled and dismantled with facility. It is capable of being applied to boats of different shape and this is attributable to the fact that the brackets include the adjusting screws 26 and the tie rod 12 is longitudinally adjustable. Because of the construction and arrangement of parts the trailer as a whole is comparatively light in weight and may be manufactured or produced at a reasonable cost.

The invention is not to be understood as restricted to the details set forth since these may be modified within the scope of the appended claims without departing from the spirit and scope of the invention.

Having thus described the invention, what I claim as new and desire to secure by Letters Patent is:

1. A trailer adapted to support for towing purposes a boat with laterally spaced upstanding sides, and comprising: a pair of brackets for association with the sides of the boat respectively; means carried by each of said brackets and adapted fixedly to secure each of said brackets to the central portion of its respective side of the boat; a wheel assembly associated with each of said brackets, each wheel assembly comprising a strut, an axle secured to one end of said strut, and a wheel rotatably mounted on the axle; means pivotally connecting the other end of each strut to the associated bracket about an axis parallel to the plane of the wheel so that said struts are adapted to swing back and forth between an operative position depending from said brackets and an inoperative position extending laterally outwards of said brackets; a tie rod; means on said tie rod detachably securing each end of said tie rod to said one end of each corresponding strut to thereby hold said wheel assemblies in their operative position; an outwardly extending fork-shaped member connected fixedly to each of said brackets and disposed beneath the pivotal connection between the bracket and the corresponding strut; means on each of said fork members adapted to receive the corresponding strut upon swinging of said strut into its operative position and to hold the strut against lateral displacement in a fore and aft direction to the boat; and outwardly extending adjustable screw means threadedly mounted in each of said brackets and within each of said fork members and in the plane defined by each of said pivotally mounted struts in moving from its inoperative to its operative position and adapted to limit the swinging of each of said struts into its operative position.

2. A trailer adapted to support for towing purposes a boat with spaced apart upstanding sides and comprising: a pair of brackets for association with the sides of the boat respectively; means carried by each of said brackets and adapted fixedly to secure each of said brackets to the central portion of its respective side of the boat; a wheel assembly associated with each of said brackets, each wheel assembly comprising a telescopic spring loaded strut connected to, and depending from, the associated bracket, each telescopic strut consisting of a tubular upper and lower section, the upper section thereof fitting slidably over the lower section, and a spiral compression spring in the upper portion of the upper section and reacting against the upper portion of the lower section to thereby urge said sections apart; means on each of said struts serving to limit sliding movement of the upper and lower sections away from one another and consisting of a horizontally elongated upper fitting having apertures at each end and the central portion, fixedly connected to the lower end of the upper section of the associated strut, a horizontally elongated lower fitting disposed beneath the upper fitting and having its central portion fixedly connected to the lower end of the lower section of the associated strut, and vertically extending rods, each having the lower end thereof fixedly connected to one end of the lower fitting and its upper portion extending slidably through one of the apertures in the ends of the upper fitting; an axle for each strut and having the central portion thereof fixedly connected to the central portion of the associated lower fitting and extending transversely outwardly and inwardly of said fitting; a wheel mounted rotatably on the outer end of each axle; a tie rod; and means on said tie rod securing each end of said tie rod to said inner end of each corresponding axle thereby to hold said wheel assemblies in fixed position with relation to each other.

HENRY G. WASSERLEIN.

REFERENCES CITED

The following references are of record in the file of this patent:

UNITED STATES PATENTS

| Number | Name | Date |
| --- | --- | --- |
| 959,170 | Riley et al. | May 24, 1910 |
| 1,939,863 | Seiter | Dec. 19, 1933 |
| 2,115,864 | Livermon | May 3, 1938 |
| 2,171,889 | Payson | Sept. 5, 1939 |
| 2,339,782 | Johnson | Jan. 25, 1944 |
| 2,410,570 | Davis | Nov. 5, 1946 |
| 2,421,671 | West | June 3, 1947 |
| 2,437,736 | Good | Mar. 16, 1948 |

FOREIGN PATENTS

| Number | Country | Date |
| --- | --- | --- |
| 871,755 | France | Jan. 22, 1942 |